United States Patent [19]
Bruce

[11] Patent Number: 5,970,901
[45] Date of Patent: Oct. 26, 1999

[54] MOORING BED ASSESSMENT APPARATUS AND METHOD

[75] Inventor: Peter Bruce, Douglas, United Kingdom

[73] Assignee: Brupat Limited, United Kingdom

[21] Appl. No.: 08/945,324

[22] PCT Filed: Apr. 26, 1996

[86] PCT No.: PCT/GB96/01006

§ 371 Date: Oct. 22, 1997

§ 102(e) Date: Oct. 22, 1997

[87] PCT Pub. No.: WO96/33907

PCT Pub. Date: Oct. 31, 1996

[30] Foreign Application Priority Data

Apr. 26, 1995 [GB] United Kingdom .................... 9508476

[51] Int. Cl.⁶ ..................................................... B63B 21/24
[52] U.S. Cl. ............................................. 114/293; 73/153
[58] Field of Search ..................................... 114/230, 293; 73/152.05, 153.44, 170.29, 170.31, 187

[56] References Cited

U.S. PATENT DOCUMENTS

3,685,479  8/1972  Bruce .
4,651,139  3/1987  Oettli .
5,325,714  7/1994  Lende et al. .............................. 73/153

Primary Examiner—Jesus D. Sotelo
Attorney, Agent, or Firm—Thelen, Reid & Priest

[57] ABSTRACT

Apparatus provided for producing measurement data capable of characterizing a burial trajectory (2) traced out in a sea-bed soil (3), and additionally to be capable of measuring a soils parameter such as the penetration resistance of the soil (3). In particular the apparatus checks for the anchorability of a particular sea-bed location and also provides a certain indication of the nature of the soil in stratae in the bed at this location. Specifically the apparatus achieves measurements via a point on a burying apparatus (5) as the burying apparatus moves in the trajectory. More especially the apparatus includes means (19, 29) located in a body (12) carried by the burying apparatus to sense the distance along the trajectory (2) separating two spaced points on the trajectory, and from that by additional means sense the position of a point in the soil at a particular instant thereby enabling the path of the trajectory (2) to be plotted. These additional means can comprise for example an inclinometer (28) indicating the angle of the body (12) at a particular instant. The body (12) can further include a penetrometer (17) to measure soil resistance.

35 Claims, 4 Drawing Sheets

MOORING BED ASSESSMENT APPARATUS AND METHOD

The present invention relates to a mooring bed assessment apparatus and method.

When drag embodiment anchors are being assessed as anchoring elements in a spread mooring for deployment in a submerged marine mooring bed, it is desirable to have knowledge of the engineering properties of the mooring bed soil at co-ordinate points on the trajectory that each anchor is expected to follow as it buries in the mooring bed in response to a large pulling force applied substantially horizontally to its attached pulling cable.

In terms of anchor fluke lengths, drag embedment anchors of the most modern designs have been shown experimentally to follow a trajectory which penetrates as much as five fluke lengths below the surface of a frequently-occurring normally consolidated clay sea bed, of shear strength gradient 1.6 kPa/m, when pulled by a chain cable. When pulled by a wire rope cable of diameter one-third that of a notional circumscribing cylinder containing the chain cable, the trajectory penetrates as much as nine fluke lengths. For a drag embedment anchor of the largest size presently in use, having a fluke length of about 6 meters and pulled by a wire rope cable, the burial trajectory forms a curve that decreases progressively in inclination to the horizontal from 50° at the initial penetration point until it becomes horizontal at a maximum anchor holding capacity of about 40 times anchor weight when the anchor has moved about 300 meters horizontally and buried about 54 meters vertically. Thus, it is advantageous to have engineering data for the mooring bed soil over a planar vertical area extending at least 300 meters along the sea bed surface and 54 meters below it at each of as many as twelve widely-separated locations in a spread mooring site to enable each trajectory to be predicted.

In the past, engineering data for deeply submerged mooring bed soils have been derived from remote shear vane tests and remote cone-penetrometer tests assessed in conjunction with laboratory tests performed on soil samples taken from a small number of boreholes drilled in the mooring bed at chosen locations on the site. These tests and samplings are performed at a range of depths to 60 meters or more below the surface of the seabed at each of the chosen locations to give a three dimensional array of soils data for the site. However, due to extremely high costs involved in performing such investigations, the number of chosen testing and sampling locations is invariably minimised. A disadvantage results in that interpolation of the small number of data points over a large site area leaves a large margin of uncertainty between the chosen locations. This, in turn, gives considerable uncertainty in predicting the performance and trajectory of a drag embedment anchor in the mooring bed soil between these locations.

In the past also, anchor burial trajectories have been measured. Horizontal co-ordinates on a trajectory have been determined by obtaining approximate horizontal displacements of the anchor by measuring the corresponding horizontal displacements of a designated point on a horizontal portion of its pulling cable which has not buried under the seabed surface. Corresponding vertical co-ordinates have been determined either directly, by using a thin cable attached to the anchor and pulled up vertically to measure its depth of penetration below the seabed surface, or indirectly, by using a pressure sensor mounted on the anchor to measure the static pressure of the column of water from the buried anchor to the sea surface via a flexible tube serving to conduct the water column from the seabed surface to the anchor. For the direct method, disadvantages of these past measurement methods include lack of certainty that the thin cable has been pulled up taut enough to become truly vertical in the soil without disturbing the buried anchor and the necessity for numerous repetitions of this operation. For the indirect method, disadvantages of these past measurement methods include uncertainty due to pressure fluctuations caused by long swells at the surface of the sea and occlusion of the water column conducting tube by wall collapse due to soil pressure, by kinking, or by ingress of soil at its free end.

An object of the present invention is to provide apparatus for producing measurement data capable of characterising a burial trajectory traced out by a point on a burying apparatus burying in a mooring bed soil.

An object of the present invention is to provide a drag embedment burying apparatus capable of establishing a deep burial trajectory in a sea bed soil while producing a horizontal resistance to drag embedment substantially less than would be produced by a drag embedment anchor and its cable while establishing such a trajectory in the soil. Another object of the present invention is to provide apparatus for producing measurement data capable of characterising a burial trajectory traced out by a point on a burying apparatus burying in a mooring bed soil. Another object of the present invention is to provide a method for assessing the anchorability of a marine mooring bed by interpreting the shape of a burial trajectory produced therein by said drag embedment burial apparatus.

According to a first aspect of the present invention, an apparatus for producing measurement data capable of characterising a burial trajectory in a sea-bed soil comprises assessment means including a body member for inclusion in burying apparatus capable of burying in a sea-bed soil along a trajectory, said assessment means serving to indicate the position in the soil of a point on any of said burying apparatus and body member during burial to enable tracing of the trajectory of said point, said assessment means including measuring means responsive to the movement of the burying apparatus during burial for measuring displacement of said point moving along said trajectory.

In a preferred embodiment, an apparatus for establishing and characterising a burial trajetory in a sea-bed soil comprises the inventive characteristic-measuring apparatus as defined above included in a burying apparatus which includes a wire rope pulling cable attached to one end of an elongate shank member another end of which is attached to a fluke member for drag embedment in said soil along a trajectory lying in a vertical plane containing said shank member, wherein the minimum projected area of said shank member and said fluke member projected in a particular direction in said plane does not exceed 20 per cent (and preferably does not exceed 10 per cent) of the corresponding maximum projected area projected at right-angles to said direction in said plane.

Preferably said measurement means serves to measure distance along the trajectory separating two spaced points thereon and additionally a further parameter comprising any of a) inclination of the trajectory at a point on the trajectory; and b) the horizontal or vertical displacement of said point relative to a datum.

Preferably said means for measuring distance along said trajectory separating two points thereon is included in said body member.

Preferably said body member is elongated and hollow and pivotably connected to said point on said burying apparatus whereby it can axially align itself in said trajectory.

Preferably a line member attached to said body member is provided which is streamable out behind said body member to coincide with said trajectory as the burying apparatus buries into the mooring bed soil.

Preferably said body member has an internal compartment containing storage means which stores said line member.

Preferably said line member at an end remote from its attachment to said body member is attached to a resistive element external to said body member which resists penetration into and remains on the mooring bed surface as said body member moves along said trajectory whereby the line member is drawn out of the body member to coincide with said trajectory.

Preferably said means for measuring distance between points along said trajectory is actuated by said line member as it exits from said body member.

Preferably said means for measuring distance between points along said trajectory comprises a pulley wheel mounted in said body member and turnable by passage thereover of said line member as it is drawn out of said body member and a magnet orbitally rotated by said pulley wheel to trigger a magnetic field sensing switch in said body member to provide an electrical pulse output which defines successive points of known fixed separation on said line member occupying said trajectory as said pulley wheel is turned by the exiting line member.

Preferably said measuring means for providing data from which the angle of inclination of the trajectory at a point on the trajectory may be determined comprises an electrical inclinometer device rigidly attached to said body member the output of which is sampled using the point-defining pulse from said magnetic field sensing circuit in said body member.

Preferably the inclinometer device comprises an accelerometer arranged to provide an output voltage proportional to the product of the earth's gravitational acceleration and the cosine of the angle of tilt of the accelerometer relative to the horizontal.

Preferably the body member contains an electrically driven data logger to store the inclination angle measurement data of all of the pulse-defined points of known fixed separation along said line member occupying said trajectory.

Preferably said storage means for said line member comprises a helically wound coil with the line member drawable out from the inside of the coil.

Preferably said internal compartment containing said storage means is filled with a grease-like substance.

Preferably said compartment is closed by a sealed sliding piston pierced by an orifice close fitting about the line member which exits therethrough whereby pressure-induced movement of the piston as the line member exits eliminates pressure differentials across the piston and so prevents ingress of mooring bed soil material into said compartment.

Preferably the line member comprises an electrical cable which serves additionally to conduct data by way of electrical signals from the body member along the path of the trajectory to an acoustic transponder adjacent the mooring bed surface whereby the trajectory characterising data may be transmitted to a receiver adjacent the surface of the sea.

In another embodiment said means for measuring distance between points along said trajectory comprises turbine vanes mounted on a shaft protruding from said body member and a magnet attached to and orbitally rotated by said shaft to trigger a magnetic field sensing switch in said body member to provide an electrical pulse output which defines successive points of known fixed separation on said trajectory as said shaft is rotated by soil impingement on said vanes due to movement of said body member through the soil along said trajectory.

Preferably said apparatus includes means for measuring a soils parameter such as for example penetration resistance.

Preferably said means for measuring a soils parameter comprises an electrically readable penetrometer arranged to measure penetration resistance of said soil.

According to a further aspect of the present invention, a method for producing data for assessing the anchorability of a sea-bed soil in a marine mooring bed comprising:

(a) laying out on the mooring bed an apparatus for establishing and characterising a burial trajectory in said soil and pulling substantially horizontally on its attached cable until a desired portion of a burial trajectory has been recorded;

(b) displaying a trace of said recorded trajectory;

(c) scrutinising said trace to identify points thereon where rapid fluctuations of slope occur which denote rapid changes of soil parameters, traversal of interfaces between layers, or engagement on obstructions all of which will influence a rating of anchorability accorded the mooring bed.

Embodiments of the present invention will now be described by way of example with reference to the accompanying drawings wherein.

Figure 1:
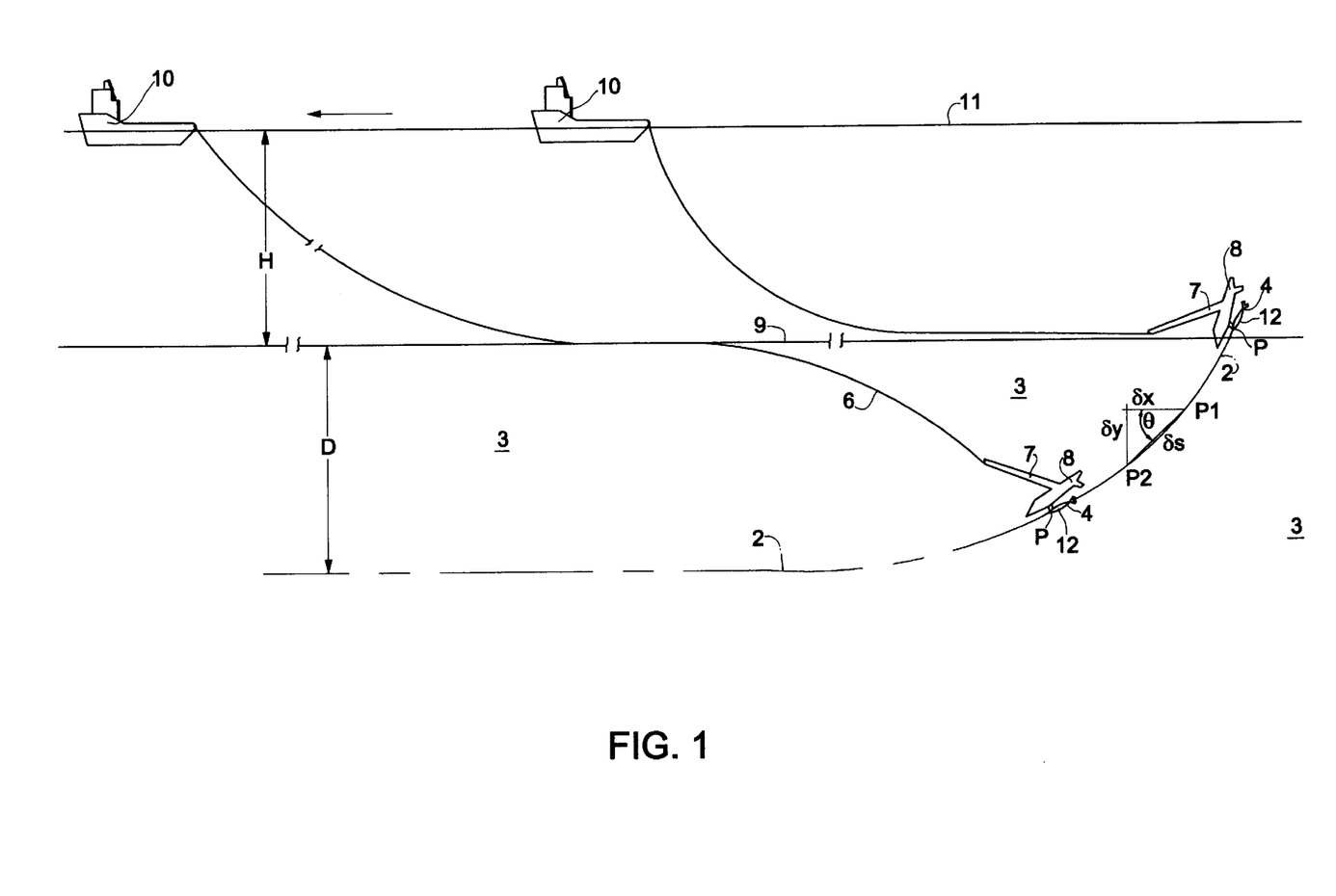
FIG. 1 is a representation (not to scale) of a mooring bed assessment apparatus in use.

Referring to FIG. 1, an apparatus 1 for establishing and characterising a burial trajectory 2 in a seabed soil 3 comprises a trajectory characteristic measuring apparatus 4 connected to a point P on a burying apparatus 5 formed by a relatively thin wire rope cable 6 pivotably attached to one end of a shank 7, the other end of which shank is attached to a fluke 8 for drag embedment burial through seabed surface 9 into seabed soil 3 when pulled horizontally thereon by a marine vessel 10 at the sea surface 11.

Trajectory 2 lies in a vertical plane containing shank 7 and commences at the seabed surface 9 at an angle of inclination of approximately 50° to the horizontal. Trajectory 2 then progressively decreases in slope until it is horizontal at a depth of embedment D below the seabed surface 9. In terms of multiples of the fore-and-aft length L of fluke 8, in a normally consolidated clay soil of shear strength gradient 1.6 kPa/meter, depth D may be in the range 9 L to 18 L and the trajectory 2 will become horizontal after apparatus 5 has been dragged a distance of approximately 40 L to 50 L measured horizontally.

Figure 2:
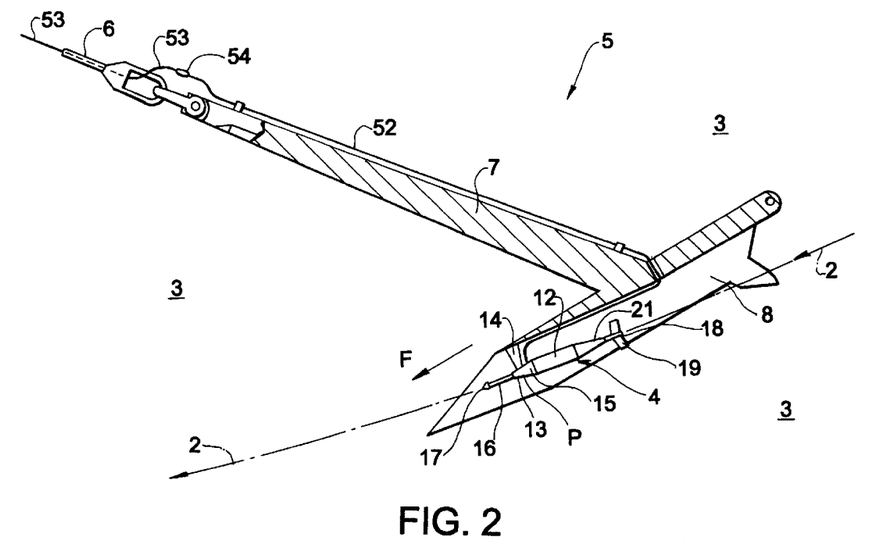
FIG. 2 is a part sectioned side view of a burying apparatus with a trajectory characteristic measuring apparatus mounted thereon.

Referring to FIGS. 1 to 4, burying apparatus 5 is constructed with minimum projected area present for each of its components when viewed in a forward direction F (FIG. 2). Fluke 8, of length L, has maximum projected area A (FIG. 3) when viewed at fight angles to direction F in a fore-and-aft central plane X—X (FIGS. 3 and 4) containing shank 7. The diameter of wire rope 6 does not exceed $$\frac{A}{24L}$$

and preferably does not exceed $$\frac{A}{37L}.$$

Figure 3:
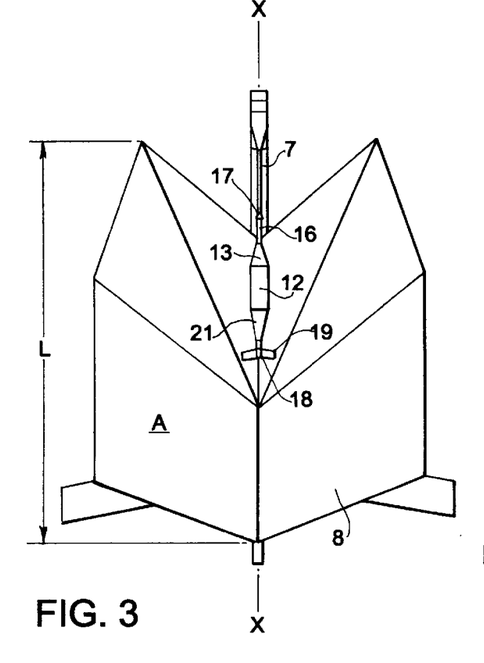
FIG. 3 is an underside plan view of the apparatus of FIG. 2 showing its maximum projected area.
Figure 4:
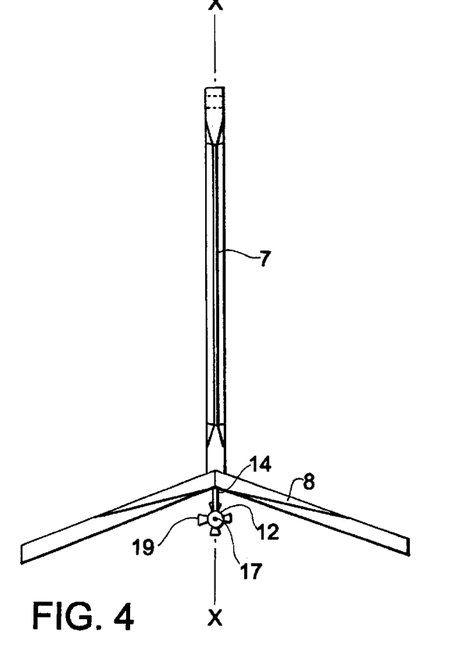
FIG. 4 is a front view of the apparatus of FIG. 2 viewed in a direction at right angles to the viewing direction of FIG. 3 wherein minimum projected area is seen.

Shank 7 and fluke 8 are streamlined and have sharp forward cutting edges to minimise resistance to forward movement in soil 3. The minimum projected area in direction F of shank 7 and fluke 8 combined does not exceed 0.2 A and preferably does not exceed 0.12 A. The minimum projected area in direction F of shank 7 does not exceed 0.1 A. Cross-sections of fluke 8 in planes parallel to plane X—X are substantially wedge-shaped with a forward included angle of not more than and preferably not more than 6°. The maximum depth of cross-sections adjacent plane X—X does not exceed 0.15 L and preferably does not exceed 0.07 L. These dimensional limitations on burying apparatus 5 allow it to penetrate very deeply to depths between 9 L and 18 L below seabed surface 9 in the beformentioned soft clay soil for a relatively low horizontal force applied to wire rope 6 by marine vessel 10.

Referring to FIGS. 2, 3 and 4, a trajectory measuring apparatus 4 includes a hollow closed cylindrical metal body 12 having a forward conical nose portion 13 attached to a lug 14 protruding from a forward portion of the undersurface of fluke 8 of burying apparatus 5 by means of pivot 15 at point P which allows body 12 to align automatically with trajectory 2 due to impingement of undisturbed soil thereon.

Figure 5:
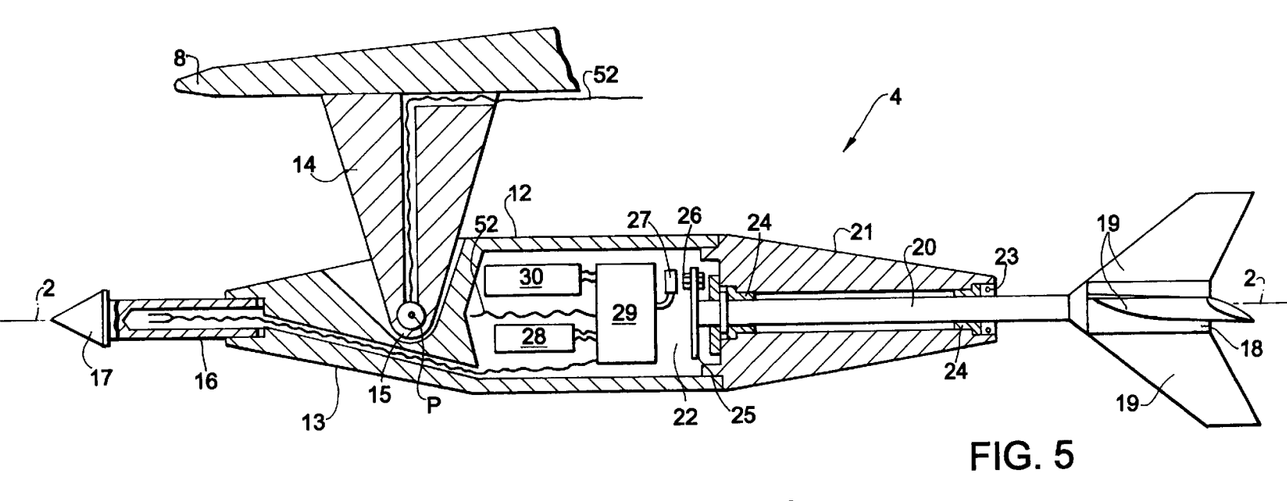
FIG. 5 is a partially sectioned side view of the trajectory characteristic measuring apparatus and part of the burying apparatus shown in FIG. 2.
Figure 6:
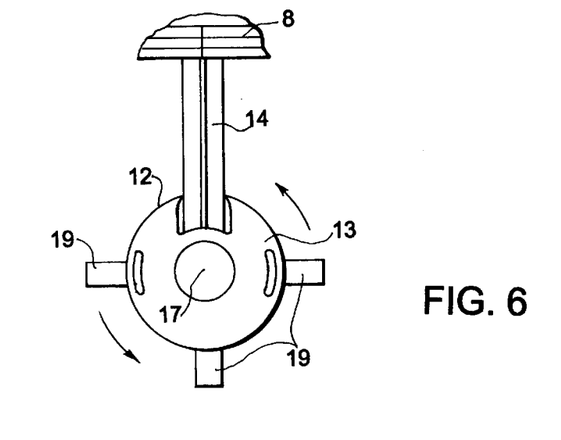
FIG. 6 is a front view of the trajectory characteristic measuring apparatus.

Referring additionally to FIGS. 5 and 6, a tubular probe 16 is attached to conical nose portion 13 which carries a known industry standard cone-penetrometer 17 in undisturbed soil in advance of body 12, the cone of the penetrometer being axially symmetrical. The penetrometer 17 provides an electrical output proportional to soil pressure thereon. A soil flow turbine rotor 18, with four radial equally spaced vanes 19, is mounted on a shaft 20 protruding axially from a conical rear tail portion 21 of body 12. Shaft 20 also extends forwardly into an interior cavity 22 inside body 12. The area swept by the turbine vanes 19 exceeds the maximum cross-sectional area of body 12 sufficiently to ensure that passing soil 3 impinges on the vanes 19 to turn rotor 18 and shaft 20 as point P moves along trajectory 2 (FIG. 2) due to the pulling force in wire rope 6. Shaft 20 is fitted with a shaft seal 23 and bearing bushes 24 pressed into tail portion 21 of body 12. A disc 25 is mounted on shaft 20 in cavity 22 and carries a magnet 26. A Hall Effect magnetic switch 27 is mounted inside cavity 22 adjacent disc 25 such that transit of magnet 26 past switch 27 as shaft 20 rotates produces an electrical pulse once for each revolution of turbine rotor 18. This electrical pulse thus denotes successively arriving equally spaced points on trajectory 2 with the spacing determined by the pitch chosen for the turbine vanes 19.

A known voltage output accelerometer acting as a sensitive inclinometer 28, a datalogger 29, and a battery power supply 30 are mounted in cavity 22 of body 12. Inclinometer 28 is mounted with its vertical axis lying in the fore-and-aft plane of burial apparatus S which contains shank 7 and with its horizontal axis parallel to the axis of body 12. The inclinometer (accelerometer) 28 gives a voltage output proportional to the product of the earth's gravitational acceleration g and the cosine of the angle θ (FIG. 1) of inclination of its horizontal axis and the axis of body 12 to the horizontal. Since g is a constant, the output of inclinometer 28 is proportional to cosθ. The output of inclinometer 28 and cone-penetrometer 17 are sampled by datalogger 29 and stored therein on the arrival of each asynchronous position-denoting pulse from switch 27.

Wire rope 6 is constructed to include electrical conductor wires 53 (FIG. 2) to permit equipment on vessel 10 to receive and store the sampled outputs as they are stored in datalogger 29. This allows the sampled outputs to be monitored as trajectory 2 is being established, with the datalogger 29 acting as a safeguard against loss of data due to possible disruption of the signal path between body 12 and the equipment on marine vessel 10. An electrical jumper cable 52 is fitted to burying apparatus 5 leading from an electrical connector 54 on conductor wires 53 in wire rope 6 via shank 7, fluke 8, and lug 14, to connect with the datalogger 29 in body 12.

With reference now to the embodiment of FIG. 7, an alternative cylindrical tail portion 31 is fitted to body 12 instead of tail portion 21 of FIG. 5 and the device of FIG. 7 has a somewhat different operation from the device of FIG. 5 as will be explained later. A shaft 32 is mounted in a forward wall 33 of tail portion 31 by means of bearing bush 34 and shaft seal 35 and protrudes into cavity 22. Disc 36 is mounted on one end of shaft 32 within cavity 22 and carries a magnet 37 to actuate Hall Effect switch 27 as previously described. A bevel gear 38 is mounted on the other end of shaft 32 in a grease-filled cavity 39 inside tail portion 31. A bevel gear 40 meshes with bevel gear 38 and is fixed coaxially to a pulley wheel 41. The aft end of cavity 39 is closed by piston 42 which is axially slidable within cylindrical tail portion 31 and is sealed thereto by sliding seals 43. Cavity 39 contains a hollow cylindrical coil 44 of twine 45 which issues from a hollow interior space 46 within coil 44 and passes twice around pulley wheel 41 before exiting from cavity 39 through nozzle 47 in piston 42 to an attachment point 48 on a removable end cap 49 push-fitted on the aft end of tail portion 31. End cap 49 has a soil flow arrestment flange 50, extending beyond the external diameter of cylindrical tail portion 31, which serves to drag end cap 49 off tail portion 31 when soil impinges thereon. The diameter of pulley wheel 41 is chosen to give two revolutions of disc 36 for each meter of twine 45 passing over pulley wheel 41. Thus, disc 36 rotates twice for each meter of movement of body 12 along trajectory 2 as for disc 25 of tail portion 21 of FIG. 5. An acoustic transponder 51 may be attached to the end cap 49 and twine 45 replaced with a thin flexible multi-strand electrical conductor connected to datalogger 29 at one end and to acoustic transponder 51 at the other end.

In use, referring now to FIG. 1, burying apparatus 5 with trajectory measuring apparatus 4 attached thereto is laid out on a seabottom surface 9 on a mooring bed, of frequently occurring normally consolidated clay of 1.6 kPa/meter shear strength gradient, in water depth H by a marine vessel 10 which applies a horizontal pull to wire rope 6 to cause fluke 8 of apparatus 5 to drag forward and penetrate through seabed surface 9. Soil pressure forces on fluke 8 and resistance forces on shank 7 and wire rope 6 constrain fluke 8 to follow a curved trajectory 2 traced out by a point P on fluke 8. The trajectory 2 has an inclination of about 50° to the horizontal initially and progressively decreases in inclination until horizontally is reached at a large penetration depth D below the seabed surface 9 of approximately 9 to 18 times the length L of fluke 8 following a horizontal movement of approximately 50 L. Body 12 of apparatus 4 is held in alignment axially with trajectory 2 by soil forces causing it to pivot about point P so that measurement of the inclination of body 12 by inclinometer 28 is also a measurement of the local inclination of trajectory 2.

Referring now to FIGS. 2 to 6, as body 12 moves through soil 3, turbine rotor 18 is turned by soil impingement on rotor vanes 19 which in turn rotates shaft 20 and disc 25. As magnet 26 on disc 25 rotates past Hall Effect switch 27, an electrical pulse is produced which triggers datalogger 29 to sample and store the electrical output of cone-penetrometer 17 and inclinometer 28. The pitch of vanes 19 is chosen to give two revolutions of turbine rotor 18 for each meter of movement of body 12 along trajectory 2. Thus, for a trajectory 2 length of approximately 300 meters, measurements of penetration resistance and trajectory inclination are made and stored at 600 points on trajectory 2 each separated by a half of a meter. These measurements are also received and stored by equipment on marine vessel 10 via the electrical conductors.53 included in wire rope 6. The horizontal component $\delta x$ and the vertical component $\delta y$ of an increment $\delta s$ of distance between any two pulse-denoted points P1 and P2 on trajectory 2 are then determined by multiplying $\delta s$ (chosen to be 0.5 meter, in this case) by the cosine and sine respectively of the mean angle $\theta$ of inclination of body 12 to the horizontal at these points (FIG. 1). Thus, $\delta x = \delta s \cos \theta$ and $\delta y = \delta s \cos \theta = 0.5 \sin \theta$. This enables the co-ordinates of any point P (x,y) in a set of points spaced ds apart on trajectory 2 to be established by computer summation as $P(\Sigma \delta x, \Sigma \delta y)$ and displayed graphically. Soil shear strength values are calculated for each pulse-denoted point from the sampled output of cone-penetrometer 17 and displayed along with the graphically plotted curve of trajectory 2.

Figure 7:
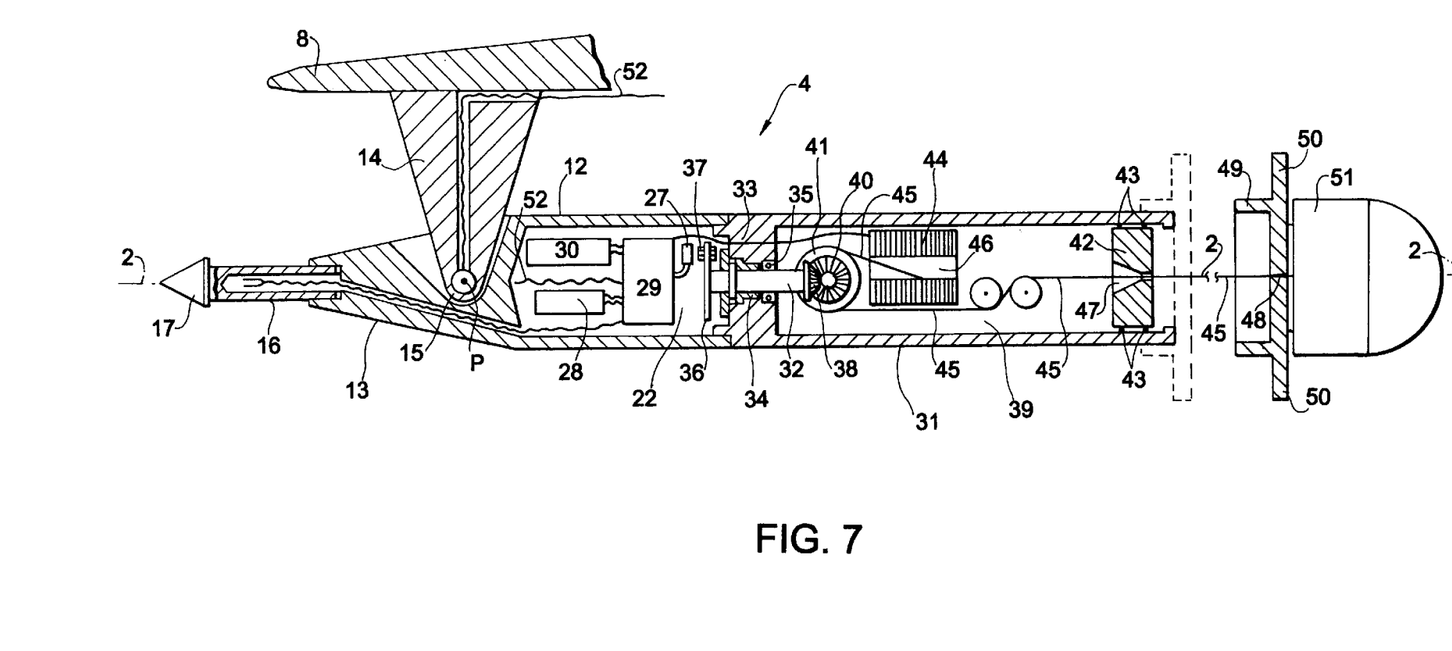
FIG. 7 is a sectioned side view of an alternative tail portion for the trajectory characteristic measuring apparatus shown in FIG. 5.

Referring now to FIG. 7, tail portion 31 in use has end cap 49 pushed off by soil impingement on flange 50 as body 12 is drawn through seabed surface 9 and along trajectory 2. End cap 49 is too large to be drawn into seabed soil 3 by the attached twine 45 and consequently remains on surface 9 of seabed soil 3 (FIG. 1) and so causes attached twine 45 to be drawn out of nozzle 47 in piston 42 to lie in trajectory 2. The exiting twine 45 grips and turns pulley wheel 41 which, via the bevel gears 38, 40 and shaft 32, turns disc 36 and rotates magnet 37 past Hall Effect switch 27 to produce trigger pulses as previously described. Meanwhile, piston 42 moves into cavity 39 under external soil pressure to increase the pressure of the grease therein as twine 45 is withdrawn. A zero pressure differential is thus maintained across piston 42 which inhibits ingress of soil 3 into cavity 39 through nozzle 47. If the twine 45 is replaced by a thin flexible multi-strand electrical conductor, data stored in datalogger 29 is transmissible to acoustic transponder 51 attached to end cap 49 at seabed surface 9 for onward transmission to an acoustic receiver on marine vessel 10 (FIG. 1) as an alternative to having an electrical conductor included in wire rope 6 (FIG. 1).

Objectives of the present invention are thus realised by burying apparatus 5 giving a value of D in the range of 9 L to 18 L in 1.6 kPa/m shear strength gradient normally consolidated clay for a relatively low horizontal dragging force, by the characterisation of trajectory 2, and by the determination of a soils parameter along this trajectory. Another objective is met by noting the shape of a particular trajectory and observing that sudden changes in slope denote deviation from uniform soil conditions such as layering discontinuities and presence of obstructions. Anchorability is then assessable from the number and severity of deviations from a smooth curve observed in the characterised trajectory. The apparatus and method of use described therefor can thus be applied to evaluate the suitability of particular locations in a mooring bed for the deployment of drag embedment anchors having high horizontal resistance to movement without need for expensive drilling of boreholes.

Modifications are, of course, possible. In particular, the measuring means for determining the horizontal and vertical displacements of a moving point on the trajectory. could be different, as could the means for determining the trajectory inclination at a point on the trajectory. Further, the means for measuring penetration resistance of the soil could be different from that descibed above. For example, a bevelled disc, or portion thereof, lying parallel to a plane of symmetry of the burying apparatus could replace the axially symmetrical cone of the known industry-standard cone-penetrometer. Said disc would allow measurements of penetration resistance at different angles of soil flow direction without need for pivotting of the penetrometer to bring it into axial alignment with the soil flow direction. Additionally, known means for measuring skin friction and pore pressures may be included in the apparatus to provide corresponding data for points on the measured trajectory. Additionally as an alternative to the movement measuring device comprising the turbine wheel 19 or twine 24 (with asociated equipment) an accelerometer may be used whereby, by utilising an integration process, the displacement of a point on the burying member 5 moving along the trajectory 3 could again be measured and the position of said moving point in the soil assessed to provide a tracing of said soil trajectory.

I claim:

1. An apparatus for producing measurement data capable of characterising a burial trajectory in a sea-bed soil, said apparatus comprising assessment means including a body member for inclusion in a burying apparatus capable of burying in a sea-bed soil along a trajectory, said assessment means serving to indicate the position in the soil of a point on any of said burying apparatus and body member during burial to enable tracing of the trajectory of said point, said assessment means including measuring means responsive to the movement of the burying apparatus during burial for measuring displacement of said point moving along said trajectory.

2. An apparatus for establishing and characterising a burial trajectory in a sea-bed soil comprising a characteristic-measuring apparatus as claimed in claim 1 included in a burying apparatus which includes a wire rope pulling cable attached to one end of an elongate shank member another end of which is attached to a fluke member for drag embedment in said soil along a trajectory lying in a vertical plane containing said shank member, wherein the minimum projected area of said shank member and said fluke member projected in a particular direction in said plane does not exceed 20 per cent of the corresponding maximum projected area projected at right-angles to said direction in said plane.

3. An apparatus as claimed in claim 2, wherein said minimum projected area of said shank member does not exceed 10 per cent of said corresponding maximum projected area projected at right angles to said direction in said plane.

4. An apparatus as claimed in claim 2, wherein said measurement means serves to measure distance along the trajectory separating two spaced points thereon and additionally a further parameter selected from the group of parameters consisting of:

a) inclination of the trajectory at a point on the trajectory; and b) the horizontal or vertical displacement of said point relative to a datum.

5. An apparatus as claimed in claim 2, wherein said means for measuring distance along said trajectory separating two points thereon is housed in said body member.

6. An apparatus as claimed in claim 1, wherein said measuring means serves to measure distance along the trajectory separating two spaced points thereon and additionally a further parameter selected from the group of parameters consisting of a) inclination of the trajectory at a point on the trajectory; and b) the horizontal or vertical displacement of said point relative to a datum.

7. An apparatus as claimed in claim 6, wherein the angle of inclination of the trajectory at a point on the trajectory is measured by an electrical inclinometer device rigidly attached to said body member the output of which is sampled using a point-defining pulse from a magnetic field sensing circuit in said body member.

8. An apparatus as claimed in claim 7, wherein the inclinometer device comprises an accelerometer arranged to provide an output voltage proportional to the product of the earth's gravitational acceleration and the cosine of the angle of tilt of the accelerometer relative to the horizontal.

9. An apparatus as claimed in claim 7, wherein the body member contains an electrically driven data logger to store data representing each of the point defining pulses of the magnetic field sensing circuit.

10. An apparatus as claimed in claim 6, wherein said means for measuring distance between points along said trajectory comprises turbine vanes mounted on a shaft protruding from said body member and means responsive to the rotation of said shaft to indicate succesive points of known fixed separation on said trajectory as said shaft is rotated by soil impingement on said vanes due to movement of said body member through the soil along said trajectory.

11. An apparatus as claimed in claim 10, wherein said responsive means comprises a magnet attached to and orbitally rotated by said shaft to trigger a magnetic field sensing switch in said body member to define an electrical pulse output which defines said successive points.

12. An apparatus as claimed in claim 6, wherein said means for measuring distance along said trajectory separating two points thereon is housed in said body member.

13. An apparatus as claimed in claim 1, wherein said means for measuring distance along said trajectory separating two points thereon is housed in said body member.

14. An apparatus as claimed in claim 1 wherein said body member is elongated and hollow and pivotably connected to said point on said burying apparatus whereby it can axially align itself in said trajectory.

15. An apparatus as claimed in claim 1, wherein a line member attached to said body member is provided which is streamable out behind said body member to coincide with said trajectory as the burying apparatus buries into the mooring bed soil.

16. An apparatus as claimed in claim 15, wherein said body member has an internal compartment containing storage means which stores said line member.

17. An apparatus as claimed in claim 16, wherein said storage means for said line member comprises a helically wound coil with the line member drawable out from the inside of the coil.

18. An apparatus as claimed in claim 16, wherein said internal compartment containing said storage means is filled with a grease-like substance.

19. An apparatus as claimed in claim 16, wherein said compartment is closed by a sealed sliding piston pierced by an orifice close fitting about the line member which exits therethrough whereby pressure-induced movement of the piston as the line member exits eliminates pressure diferentials across the piston and so prevents ingress of mooring bed soil material into said compartment.

20. An apparatus as claimed in claim 16, wherein said line member at an end remote from its attachment to said body member is attached to a resistive element external to said body member which resists penetration into and remains on the mooring bed surface as said body member moves along said trajectory whereby the line member is drawn out of the body member to coincide with said trajectory.

21. An apparatus as claimed in claim 16, wherein said means for measuring distance between points along said trajectory is actuated by said line member as it exits from said body member.

22. An apparatus as claimed in claim 16, wherein said means for measuring distance between points along said trajectory comprises a pulley wheel mounted in said body member and turnable by passage thereover of said line member as it is drawn out of said body member and a magnet orbitally rotated by said pulley wheel to trigger a magnetic field sensing switch in said body member to provide an electrical pulse output which defines successive points of known fixed separation on said line member occupying said trajectory as said pulley wheel is turned by the exiting line member.

23. An apparatus as claimed in claim 15, wherein said line member at an end remote from its attachment to said body member is attached to a resistive element external to said body member which resists penetration into and remains on the mooring bed surface as said body member moves along said trajectory whereby the line member is drawn out of the body member to coincide with said trajectory.

24. An apparatus as claimed in claim 23, wherein said means for measuring distance between points along said trajectory is actuated by said line member as it exits from said body member.

25. An apparatus as claimed in claim 23, wherein said means for measuring distance between points along said trajectory comprises a pulley wheel mounted in said body member and turnable by passage thereover of said line member as it is drawn out of said body member and a magnet orbitally rotated by said pulley wheel to trigger a magnetic field sensing switch in said body member to provide an electrical pulse output which defines successive points of known fixed separation on said line member occupying said trajectory as said pulley wheel is turned by the exiting line member.

26. An apparatus as claimed in claim 15, wherein said means for measuring distance between points along said trajectory is actuated by said line member as it exits from said body member.

27. An apparatus as claimed in claim 26, wherein said means for measuring distance between points along said trajectory comprises a pulley wheel mounted in said body member and turnable by passage thereover of said line member as it is drawn out of said body member and a magnet orbitally rotated by said pulley wheel to trigger a magnetic field sensing switch in said body member to provide an electrical pulse output which defines successive points of known fixed separation on said line member occupying said trajectory as said pulley wheel is turned by the exiting line member.

28. An apparatus as claimed in claims 15, wherein said means for measuring distance between points along said trajectory comprises a pulley wheel mounted in said body member and turnable by passage thereover of said line member as it is drawn out of said body member and a magnet orbitally rotated by said pulley wheel to trigger a magnetic field sensing switch in said body member to provide an electrical pulse output which defines successive points of known fixed separation on said line member occupying said trajectory as said pulley wheel is turned by the exiting line member.

29. An apparatus as claimed in claim 15, wherein the line member comprises an electrical cable which serves additionally to conduct data by way of electrical signals from the body member along the path of the trajectory to an acoustic transponder adjacent the mooring bed surface whereby the trajectory characterising data may be transmitted to a receiver adjacent the surface of the sea.

30. An apparatus as claimed in claim 1 including means for measuring soil parameter such as for example penetration resistance.

31. An apparatus as claimed in claim 30 wherein said means for measuring a soils parameter comprises an electrically readable penetrometer arranged to measure penetration resistance of said soil.

32. A method for producing data for assessing the anchorability of a sea-bed soil in a marine mooring bed comprising:
 (a) laying out on the mooring bed an apparatus for establishing and characterising a burial trajectory in said soil and pulling substantially horizontally on its attached cable until a desired portion of a burial trajectory has been recorded:
 (b) displaying a trace of said recorded trajectory:
 (c) scrutinising said trace to identify points thereon where rapid fluctuations of slope occur which denote rapid changes of soil parameters, traversal of interfaces between layers, or engagement on obstructions all of which will influence a rating of anchorability accorded the mooring bed.

33. An apparatus for producing measurement data capable of characterising a burial trajectory in a sea-bed soil, said apparatus comprising assessment means including a body member for inclusion in a burying apparatus adapted for burying in a sea-bed soil, said assessment means being adapted to produce data for determining positions in the soil of a point (P) on any of said burying apparatus and body member during burial to enable determination of the trajectory of said point (P), said assessment means including measuring means responsive to the movement of the burying apparatus to produce said data.

34. An apparatus for establishing and characterising a burial trajectory in a sea-bed soil, said apparatus comprising a characteristic-measuring apparatus in combination with a burying apparatus including means for attaching the burying apparatus to a pulling cable for drag embedment in said soil, said characteristic measuring apparatus comprising an apparatus for producing measurement data capable of characterising a burial trajectory in a sea-bed soil, said apparatus comprising assessment means including a body member for inclusion in a burying apparatus adapted for burying in a sea-bed soil, said assessment means being adapted to produce data for determining positions in the soil of a point (P) on said apparatus during burial to enable determination of the trajectory of said point (P), said assessment means including measuring means responsive to the movement of the burying apparatus to produce said data.

35. A method for producing data for assessing the anchorability of a sea-bed soil in a marine mooring bed comprising the steps of:
 (a) laying out on the mooring bed an apparatus for establishing and characterising a burial trajectory in said soil and pulling on a pulling cable attached to the apparatus until a desired portion of a burial trajectory has been recorded; and
 (b) examining the characterised trajectory to identify points thereon where rapid fluctuations of slope occur which denote rapid changes of soils parameters, traversal of interfaces between layers, and engagement on obstructions any one of which will influence a rating of anchorability assignable to the mooring bed.

* * * * *